Sept. 15, 1942. P. F. LITTLE 2,295,586
MEANS FOR TESTING THE EFFICIENCY OF INTERNAL COMBUSTION ENGINES
Filed May 9, 1940
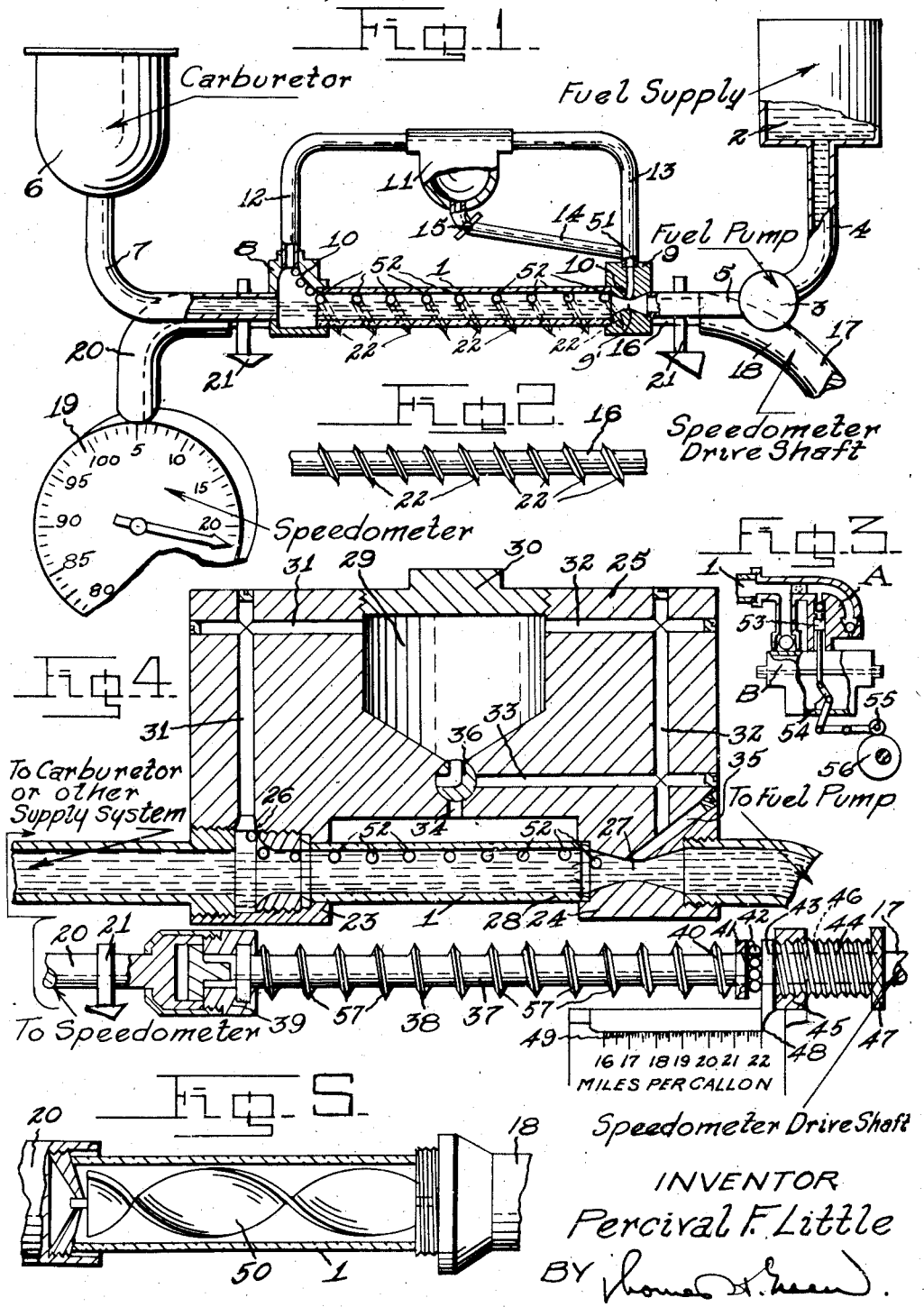
INVENTOR
Percival F. Little
BY
ATTORNEY Patented Sept. 15, 1942

2,295,586

UNITED STATES PATENT OFFICE 2,295,586

MEANS FOR TESTING THE EFFICIENCY OF INTERNAL COMBUSTION ENGINES

Percival F. Little, Arlington, Va.

Application May 9, 1940, Serial No. 334,230

11 Claims. (Cl. 73—51)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to means for determining the rate of flow of a fluid as compared to a driven member; more particularly it is directed to means for testing the efficiency of an internal combustion engine with reference to the amount of fuel consumed for a predetermined amount of work done by said engine.

One of the objects of the invention is to provide means for determining whether an internal combustion engine uses more or less fuel or the rated amount for a predetermined amount of work.

Another object of the invention is to provide a device whereby a visual indication may be made of the efficiency of a fuel used on an internal combustion engine through comparison of the rate of flow of the fuel with the speed of a mechanism operated by the engine.

Briefly stated, the invention as applied to an automobile engine comprises a transparent tube of a predetermined diameter which is mounted in a fuel line leading from a source of fuel supply to a carburetor of an internal combustion engine, means for producing air bubbles at arbitrarily timed intervals in the fuel flowing through the tube and a threaded member coupled to the speedometer drive shaft and having a suitable number of fixed threads of a predetermined pitch provided thereon. Providing an expansible coiled spring member on a threadless member in place of the threaded member, and means for adjusting the length of said expansible member whereby the amount of fuel consumed by the engine may be determined or the employment of a twisted vane which is rotated by the fuel flowing through said tube in place of producing the air bubbles in said tube is also included within the scope of the invention. A small air pump may be used to supply the small air bubbles.

In all forms, the object is to compare the rate of flow of the fuel being delivered for use in the engine at any moment with the speed of rotation of a shaft driven by the engine so that an instantaneous reading of the fuel consumption per revolution of the engine or its equivalent ratio according to the scale used may be determined at any instant. This is done by precalibrating the pitch of a helix on the shaft that will produce a linear axial movement of a point traveling along the helix as it turns with the shaft, at the same speed as the movement of the fuel in the delivery line flows through a uniform glass or other transparent tube conveniently placed alongside of the helix on the shaft for a certain consumption of fuel. Then a scale may be made with an indicator which is adjusted with the change in pitch of the helix to show the consumption at any instant by adjusting the pitch of the helix so that the velocities of the fuel through the tube and the point on the helix are matched or made equal.

With the above and other objects and advantages in view the invention consists of certain features of construction and operation of parts which will hereinafter appear and in which:

Fig. 1 is a fragmentary assembly view partly in section of component parts used in carrying out the invention;

Fig. 2 is a side elevation of a screw-threaded member which is adapted to be coupled to the speedometer drive shaft of a vehicle;

Fig. 3 is a fragmentary view partly in section of an air pump which may be used in carrying out the invention;

Fig. 4 is a fragmentary view of a modified form of the invention; and

Fig. 5 is a fragmentary sectional view of a vane structure which also may be used to indicate the flow of fuel in carrying out the invention.

In the illustrated embodiment characterizing the invention 1 indicates a horizontally extending tube made of any suitable transparent material such as glass or the like which is of a predetermined diameter and mounted in communication with a source of fuel supply 2 through a fuel pump 3 by means of conduits 4 and 5 and with a carburetor 6 by means of a conduit 7. The ends of the tube 1 are seated in any suitable leakproof manner in end compartment members 8 and 9 having suitably rounded surfaces 10 formed therein, with a Venturi throat 9' formed in the end compartment member 9.

The compartments 8 and 9 are connected in communication with a chamber 11 by means of conduits 12 and 13 respectively, which extend from the upper end of the chamber 11. The conduit 13 enters the compartment member 9 at the Venturi throat 9'. The chamber 11 is also connected in communication with the conduit 13 by means of a conduit 14 which has a valve 15 provided thereon and extends from the bottom of the chamber. The valve 15 is of the same form as that shown in Fig. 4 at 36 so as to connect the conduit 14 with the atmosphere when desired for the purpose of admitting more air into the system. It is understood that during operation some of the air in chamber 11 will gradually be absorbed by the fuel and carried on through the carburetor. The pump A when connected to conduit 1 as shown in Fig. 3, supplies the necessary air bubbles in place of the system shown in Fig. 1 where it is necessary to provide a venturi and an air reservoir connected in the by-pass to supply the necessary bubbles. Obviously it is not necessary that the pump A be driven in synchronism with the engine although normally it is driven thereby.

At the rear of the tube and extending horizontally in line therewith is a threaded member 16 in the form of a shaft or rod which is suitably coupled at its ends to a shaft portion 17 of a speedometer drive shaft 18 and to a speedometer 19 by another shaft portion 20. The member 16 is rotatably mounted on supports 21 and is provided with a predetermined number of fixed threads 22 of a predetermined pitch, as illustrated in Figs. 1 and 2. Air bubbles may be produced in the tube by means of any suitable type of air pump such as indicated generally by A in Fig. 3.

In Fig. 4 there is illustrated a modified form of the invention in which the tube 1 is suitably sealed within hollow downwardly extending portions 23 and 24, formed on the lower surface and at the outer edges of a substantially solid housing 25. The projecting portion 23 of the housing is provided with a rounded surface 26 and the projecting portion 24 thereof is provided with a Venturi opening 27 at the inner end thereof adjacent to the end 28 of the tube 1.

The housing 25 is provided with a chamber 29 at the upper central portion thereof on which is removably mounted a cap 30, and is drilled at suitable places to provide passageways 31 and 32. The passageway 31 leads from the upper end of the chamber 29 into the projecting portion 23 and the passageway 32 leads into a passageway opening into the venturi 27 in the projecting portion 24 as hereinafter described. Passageways 33, 34 and 35 are also provided in the housing 25. The passageway 33 leads from a two-way rotary valve 36 at the bottom of the chamber 29 to the passageway 32 and the passageway 34 also leads from the two-way rotary valve 36 to the atmosphere at the lower portion of the housing and the passageway 35 being drilled at an angle extends in the side of the housing from the Venturi opening 27 in the projecting portion 24 of the housing. The passageway 35 is plugged at its outer end and connects with the passageway 32. The chambers 11 and 29 merely serve as reservoirs for the air used in the systems of Figs. 1 and 4 respectively in supplying the necessary air to form air bubbles in these systems.

Adjacent to the tube 1 of the housing 25 is a rotatable member 37 in the form of a shaft or rod which is suitably coupled at its ends to the speedometer drive shaft. The member 37 has an expansible coiled spring member 38 one end of which is adjustably mounted thereon the other end being fixed to the shaft 37 adjacent to the coupling 39. The spring is adapted to abut or to be secured at its adjustable end 40 to one side of a ring or flange 41 slidably mounted on one end of the member 37. The other side of the ring or flange 41 is adapted to bear against ball bearings 42 which are adapted in turn to abut against one side of an axially slidable pointer member 43 abutting the inner end of a sleeve 44. The sleeve 44 is adjustably mounted on a support 45 and freely mounted on an extension 46 of the member 37. A knurled finger engaging portion 47 is provided on the outer end of the sleeve 44 and the member 43 is provided with a pointer 48 which is adapted to be moved along a scale 49 graduated in miles per gallon.

A twisted vane 50 may be rotatably mounted in the tube 1 as illustrated in Fig. 5 to be used in indicating the rate of flow of the fuel through the tube.

It will be readily understood that even though the rotatable member 37 and the expansible member 38 are illustrated in Fig. 4 as being below the tube 1 that they are preferably placed in back of the tube.

In employing the device illustrated in Fig. 1, assuming that an internal combustion engine is rated as adapted to operate at a consumption equal to twenty-two miles of road travel of a vehicle on one gallon of fuel. Air is caused to enter the compartment 9 at the right of the tube 1 from the end 51 of the conduit 13 and to enter the fuel flowing through the tube 1 from the source of supply 2 to the carburetor 6 whereby air bubbles 52 at arbitrarily regular spaced intervals are produced in the tube by suction of the fuel passing through the restriction or venturi 9' which air bubbles travel in spaced formation along the upper surface of the tube as illustrated. The threads 22 on the shaft member 16 are so spaced that when the engine is working at its rated fuel consumption efficiency the velocity of the edges thereof will be in synchronism or in other words will be seen to travel at the same velocity as the air bubbles 52 in the tube, thus indicating that the engine is working at its rated fuel consumption. Should the speed of the air bubbles 52 be greater than the speed of the threads 22 on the shaft member 16, it will then be known that more fuel is being used than the rated efficiency of the engine and in case the air bubbles move with the fuel across the tube at a less speed than the threads 22 on the shaft member 16, it will indicate that less fuel is used than the rated efficiency of the engine.

The air bubbles 52 may be produced in the fuel flowing through the tube 1 by means of an air pump 53 illustrated in Fig. 3 which may be operated through suitable linkages 54 which may in turn be operated by a rocker 55 and cam 56 operated by the engine (not shown). B is a conventional fuel pump unit.

In using the device illustrated in Fig. 4 the expansible member 38 on the rotatable member 37 is so adjusted that the coils 57 thereof will register with the air bubbles 52 when the engine for a vehicle is working at its rated fuel consumption per unit of travel of the vehicle. Should the air bubbles 52 become out of synchronism with the threaded coils 57 an indication would be had that the engine is using more or less fuel than the rated fuel consumption of the engine. By turning the knurled finger engaging member 47 on the sleeve 44 in a clockwise or counter-clockwise direction the sleeve is moved toward the left or right on the support 45 thereby forcing the pointer member 43 to the left or right which by bearing against the ball bearings 42, the flange 41 is forced to the left or right to thus move the end 40 of the expansible member 38 which changes the pitch of the threaded coils 57 on the expansible member. When the threaded coils 57 on the expansible member 38 apparently travel at the same velocity as the air bubbles 52 flowing in the tube 1 the pointer 48 will indicate on the scale 49 the fuel consumption of the vehicle in miles per gallon.

Should the twisted vane 50 illustrated in Fig. 5 be employed in the tube 1, the fuel flowing through the tube 1 would rotate it at the same speed as the rate of flow of the fuel through the tube and the apparent velocity of the upper edge of the vane would be compared with the apparent velocity of a point on the threads of a threaded member similar to that shown in Figs. 1 and 4.

It will thus be seen that there is provided means for testing the fuel consumption of an engine for a predetermined amount of work and also the amount of fuel used per unit of travel of a vehicle which is well adapted for all the purposes indicated. Even though there has been herein shown and described certain features of construction and operation of parts, it is nevertheless to be understood that various changes may be made therein if the changes do not depart from the spirit or scope of the claims.

Having described my invention, what I claim as new and wish to secure by Letters Patent is:

1. An instrument for testing the fuel consumption efficiency of an internal combustion engine comprising in combination a source of fuel supply, a transparent member connected in communication with said source of fuel supply and said engine, means for producing a plurality of air bubbles in spaced formation in the fuel passing through said transparent member and a member having a helical thread of predetermined pitch placed alongside of said transparent member and operated by said engine.

2. An instrument for determining the fuel consumption efficiency of internal combustion engines for vehicles comprising in combination, a source of fuel supply, a transparent member connected in communication with said source of fuel supply and said engine, means for producing a plurality of visual indications at arbitrarily spaced intervals in the fuel passing through said transparent member, a member operated by said engine placed alongside of the transparent member and an axially expansible helical member mounted to turn with said second mentioned member, means for axially expanding the helical member, an indicator on said means, and a scale for said indicator.

3. An instrument for testing the fuel consumption efficiency of internal combustion engines for vehicles comprising in combination a source of fuel supply, a transparent member, connected in communication with said source of supply and said engine, means for producing air bubbles at arbitrarily spaced intervals in the fuel passing through said transparent member, a member connected to be operated by said engine placed alongside the transparent member, an axially expansible helical member mounted to turn with said second mentioned member, means for expanding said helical member and means for indicating the amount of expansion of said helical member.

4. An instrument for determining the fuel consumption efficiency of internal combustion engines, comprising in combination a source of fuel supply, a transparent member connected in communication with said source of fuel supply and said engine, a vane rotatably mounted in said transparent member, said vane adapted to be operated by fuel passing through said transparent member and a member operated by said engine, said member being screw-threaded with a predetermined pitch and placed alongside of said transparent member.

5. An instrument for determining the fuel consumption efficiency of internal combustion engines, comprising in combination a source of fuel supply, a transparent member connected in communication with said source of fuel supply and said engine, a vane rotatably mounted in said transparent member, said vane adapted to be operated by fuel passing through said transparent member, a member operated by said engine and placed alongside of the transparent member, an axially expansible helical member mounted to turn with said second mentioned member, means for axially expanding the helical member, an indicator on said means and a scale for said indicator.

6. A device for indicating the consumption of fuel in an engine driven vehicle consisting of a transparent tube having fittings for connecting it in the fuel supply line to the engine means for visibly indicating the actual rate of flow through said tube, a shaft mounted alongside the tube and having fittings for connecting it for rotation with some engine or vehicle driven element, a helical spring mounted around said shaft, one end of said spring being fastened to the shaft the other end being fastened to a collar mounted for rotation with the shaft but adjustable therealong, means including an indicator element for adjusting said collar and a scale positioned back of said indicator element.

7. A device for indicating the fuel consumption of an engine mounted in a vehicle comprising a transparent tube adapted to be inserted in the fuel supply line to the engine, means for visibly indicating the actual flow of the fuel through the tube, a shaft element mounted alongside the tube and adapted to be inserted in a speedometer drive shaft, a helical spring mounted around said shaft element and rigidly connected thereto at one end, the other end engaging the shaft element, a collar loosely mounted on the shaft element and attached to the last named end of the spring, an indicator and a scale mounted parallel to the shaft element, said indicator being adjustable and connected to the collar to adjust it along the shaft element for the purpose of changing the pitch of the helical spring.

8. Apparatus for determining the efficiency of an internal combustion engine in a motor vehicle comprising in combination means for automatically producing visual flow indications in fuel used by said engine, said indications flowing with the fuel and representing the rate of fuel consumption, and means responsive to the linear speed of the vehicle coacting with the flow indications to indicate the distance traveled per unit of fuel consumed.

9. Apparatus for determining the efficiency of an internal combustion engine in a motor vehicle comprising in combination means for producing flow indications representing the rate of fuel consumed and means including a helical member responsive to the linear speed of the vehicle, said helical member coacting with the flow indications to indicate the distance traveled per unit of fuel consumed.

10. An instrument for testing the fuel consumption efficiency of an internal combustion engine for vehicles comprising in combination a source of fuel supply, a transparent member having ends connected in communication with said source of fuel supply and said engine, a restricted fuel opening provided at one end of said transparent member, a source of air supply, means connecting said source of air supply with said restricted opening, whereby air bubbles at abritrarily spaced intervals are produced in the transparent member by the suction of the fuel passing through said restricted opening, said air bubbles adapted to flow with the fuel through said transparent member to the other end thereof, means connecting the last mentioned end of said transparent member with said source of air supply and a member operated by said engine, said last mentioned member coacting with said air bubbles for indicating the distance traveled by said vehicle per unit of fuel consumed.

11. An instrument for determining the fuel consumption efficiency of an internal combustion engine in a motor vehicle comprising in combination, a source of fuel supply, a transparent member connected in communication with said source of fuel supply and said engine, an air pump connected to produce a plurality of visual indications at arbitrarily spaced intervals in the fuel passing through said transparent member, and means responsive to the linear speed of the vehicle coacting with the visual indications to indicate the distance traveled per unit of fuel consumed.

PERCIVAL F. LITTLE.